Patented Apr. 5, 1938

2,113,485

UNITED STATES PATENT OFFICE 2,113,485

PROCESS FOR THE PRODUCTION OF ARTIFICIAL RESINS

Ignaz Kreidl, Vienna, Austria

No Drawing. Application December 15, 1932, Serial No. 647,489. In Austria December 19, 1931

14 Claims. (Cl. 260—3)

The present invention relates to resinous condensation products which can be pressed or molded, used as lacquers, or put to any of the other uses to which condensation products are put. The invention is based on the discovery that artificial resins, such as, for example, condensation products of aldehydes with other resin-forming substances, are vulcanizable by compounds liberating sulphur, such as thiosulphates or polythionates or substances containing sulphur, which in themselves or in the presence of oxidizing agents are capable of being transformed into thiosulphates or polythionates. By the vulcanization process similar effects are obtained with vulcanization of india rubber, i. e. highly plastic, artificial resins of high resistance toward water and acids. These products can be readily pressed to homogeneous masses. In vulcanizing artificial resins, the same rules apply as in vulcanizing india rubber. Thus, the vulcanization of artificial resins is favored by the same rubber accelerators known in the industry. Furthermore, an increase of the sulphur quantity introduced by vulcanization has also, in case of these products, the effect that the products become brittle and hard, in the same manner as do the products obtained by super-vulcanizing india-rubber. The upper limit of a suitable content of sulphur amounts to about 1.5% sulphur in the finished product, but preferably a slightly less amount is actually used. The condensation can be also carried out under conditions which lead to glass-clear i. e., transparent, products. The products obtained by vulcanizing according to the present invention, can be pressed to homogeneous masses at comparatively low pressures.

The process according to the present invention can be carried out in such a manner that the vulcanization is effected during the condensation reaction, the substances liberating sulphur being added to the resin forming components, (such as for example urea and aldehydes) preferably after the resin forming components have begun condensation.

As sulphur containing substances, such materials which not only act as rubber accelerators but also as condensing agents or accelerators for the condensation, such as polysulphides of alkaline metals and alkaline earth metals are used.

The quantity of sulphur which, by the method employed in the present invention, is introduced into the condensation product by vulcanization is best determined for the process according to the invention in such a manner that the quantity taken up by the resin amounts at most to about to 1½% of the finished resin, preferably less.

Suitable oxidizing agents for transforming the sulphur containing substances into thiosulphates or polythionates are, for example, substances yielding chlorine, such as p-toluol-sulphamide-sodium-chloride, sodium hypochlorite and the like, and in addition to these persulphates may be used.

In carrying out the invention it is advantageous to effect the vulcanization in the presence of rubber accelerators whereby the taking up of sulphur by the condensation product is favored. On the one hand, this has the advantage of introducing greater quantities of sulphur into the condensation product than would normally be taken up as vulcanization sulphur and, on the other hand, it has the advantage that the sulphuration itself is favored, and under certain circumstances the quantity of sulphur can be reduced, which in many cases may be very desirable.

As rubber accelerators all substances which are known in india-rubber manufacture can be used, for instance, the compounds of the alkaline earths and also those rubber accelerators such as salts of dithio-acids, such as xanthogenic acid.

The use of rubber accelerators soluble in water is advantageous.

Rubber accelerators which are soluble in organic solvents can be brought into a form soluble in water by introducing hydrophylic groups or by eliminating hydrophobic groups or by exchanging hydrophobic for hydrophilic groups.

The quantity of the rubber accelerators used should not exceed a certain maximum and an addition of about 1–2% is sufficient to obtain the desired effect.

The use of such materials which not only act as vulcanizing agents but act at the same time as rubber accelerators, offers special advantages for the vulcanization. Such a material is, for example, barium polysulphide.

The vulcanized resins can be subjected to precipitation or gelatinization. The precipitation and gelatinization can be effected by acidulation, for instance by adjusting the hydrogen ion concentration of the hot solution to between pH 4 to 6, or by adjustment while cold to between pH 2 to 3.

Thus, by precipitation or gelatinization of the resins in the condensation solution it is possible to obtain a moulding powder or a moulded product without use of fillers. But the process according to the invention can be carried out also in such a way that a filling material is impregnated with the condensation solution, the precipitation or gelatinization if desired being allowed to take place only in this reaction mass.

All the usual rules apply to working up: for instance addition of softening materials, fillers and the like.

The resins may be employed alone or as additions to other high-class resins or masses and also for the manufacture of spirit-, oil-, cellulose-, ester-lacquers, and for the production of hard artificial masses.

Examples (1) 240 grams of urea and 1.2 grams potassium xanthogenate are dissolved in 620 ccm. of 38.5% formaldehyde. The solution is heated during 20 minutes to a temperature of 80° C., then a solution of 4 grams of sodium polysulphide is added; after mixing a red-brown colored solution with suspended sulphur therein results. 3 grams borax are added to the mixture and it is boiled for three hours. During the boiling, the segregated sulphur slowly disappears and a light-yellow liquid results, which in the cold does not give the sulphur-reaction with lead-acetate. By boiling this solution adjusted to between a pH of 4.5 to 6.0 the sulphur containing resin is deposited which after washing, drying and grinding can be pressed hot to glass-clear (i. e. transparent) articles which are completely homogeneous, very elastic and resistant to waters and acids.

(2) 240 grams of urea and 1.2 grams potassium xanthogenate are dissolved in 550 ccm. of 38.5% formaldehyde. The solution is heated to 40° C. and a solution of 20 grams sodium tetrathionate and 2 grams borax is added. After heating for one hour to 60° C., the mixture is boiled for two hours. Then the condensate is taken up by 60 grams cellulose and the wet mass is dried. After sufficient grinding the resulting powder can be hot pressed to exceedingly resistant objects after the usual hardening accelerators etc. have been added.

(3) 240 grams urea are dissolved in 620 ccm. of 38.5% formaldehyde. Then a solution of 12 grams barium polysulphide is added, and the mixture boiled for six hours till all of the sulphur which has segregated is taken up and a clear solution results. From this solution, the resin is precipitated from the cold solution which has a pH of about 2 to 3. The product obtained can be pressed hot after drying and grinding it to clear, highly resistant articles.

(4) 240 grams of urea are dissolved in 620 ccm. of 38.5% formaldehyde. Then three grams potassium xanthogenate, 4 ccm. NaOH (10%) and 2 grams borax are added and over the mixture is poured a suspension of 10 grams sulphur in 100 ccm. petroleum. After heating the whole for 8 hours the petroleum and the sulphur not taken up is taken off; then the resin with a pH of 4 to 6, is precipitated while hot and further worked as stated above.

(5) 240 grams of urea and 1.2 grams potassium xanthogenate are dissolved in 620 ccm. of 38.5% formaldehyde. The solution is boiled for one hour; then a mixture of 35 grams Na$_2$S and 15 grams p-toluol-sulphon chloramid sodium or 20 grams sodium persulphate is added. After the boiling, 3 grams borax are added and the whole heated for three hours. After coagulation of the resin by acidulation, the resin is dried and ground and furnishes exceedingly clear, homogeneous, very elastic pressed products.

As used in the claims "alkaline salt" means an alkali metal or an alkaline earth salt.

As used in the appended claims the term "vulcanizing agents" means those substances which are used in the vulcanization of rubber to supply sulphur to the rubber.

Thiourea may be used in place of urea, or admixed with urea, in the above examples.

What I claim is:

1. A process of manufacturing resinous condensation products in which the condensation of a carbamide with an aldehyde is carried out in alkaline solution in the presence of a compound containing a plurality of interconnected sulphur atoms, said compound being incapable of reacting with aldehydes to form sulphurized aldehydes such as thioaldehydes or the like.

2. A process according to claim 1 in which the condensation of a carbamide with an aldehyde is carried out in the presence of a salt containing a plurality of interconnected sulphur atoms, the salt being selected from the group of the salts of the alkali metals and earth alkaline metals.

3. A process according to claim 1, in which the condensation is carried out in the presence of a salt selected from the group consisting of polysulfides of alkali metals and alkaline earth metals.

4. A process as claimed in claim 1, in which the condensation is carried out in the presence of a salt or salts containing oxygen and a plurality of interconnected sulphur atoms.

5. A process according to claim 1 in which the condensation is carried out in the presence of a salt or salts containing oxygen and a plurality of interconnected sulphur atoms, said salt or salts being selected from the group of polythionates and thiosulfate.

6. A process according to claim 1 in which the condensation is carried out in the presence of a compound or a salt containing a plurality of interconnected sulphur atoms, which compound or salt is produced in situ.

7. A process according to claim 1 in which the condensation is carried out in the presence of a compound or salt containing a plurality of interconnected sulphur atoms, which compound or salt is produced in situ in the presence of oxidizing agents.

8. A process as claimed in claim 1 in which the amount of sulphur introduced into the condensation product by means of the compound containing a plurality of interconnected sulphur atoms, is calculated so as to amount at the utmost to about 1.5% of the finished product.

9. A process as claimed in claim 1 in which the sulphurized resin contained in the condensation mixture is precipitated in solid form by acidifying the condensation solution.

10. A process as claimed in claim 1 in which the condensation and sulphurization is carried out in the presence of an accelerator.

11. A process as claimed in claim 1 in which the condensation and sulphurization is carried out in the presence of an accelerator comprising a rubber vulcanizing accelerator.

12. A process as claimed in claim 1 in which the condensation and sulphurization by means of the compound containing a plurality of interconnected sulphur atoms is effected in the presence of an accelerator comprising a xanthogenate.

13. A process as claimed in claim 1 in which the sulphurized resin contained in the condensation mixture is precipitated in solid form by acidifying the cold condensation solution to the extent that it possesses a pH value of from 2 to 3.

14. A process as claimed in claim 1 in which the sulphurized resin contained in the condensation mixture is brought into a solid form by acidifying the hot condensation solution to the extent that it possesses a pH value of from 4 to 6.

IGNAZ KREIDL.